United States Patent
Buck et al.

(10) Patent No.: US 6,401,620 B1
(45) Date of Patent: Jun. 11, 2002

(54) METHOD AND APPARATUS FOR COMPENSATING TORSIONAL VIBRATIONS OF A PRINTING MACHINE BY INTRODUCING TORQUES WHICH COMPENSATE THE VIBRATION EXCITATION

(75) Inventors: Bernhard Buck, Heidelberg; Michael Merz, Sandhausen, both of (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/540,937

(22) Filed: Mar. 31, 2000

(30) Foreign Application Priority Data

Mar. 31, 1999 (DE) .......................... 199 14 627

(51) Int. Cl.$^7$ ................................ B41F 5/00
(52) U.S. Cl. ........................ 101/484; 101/216
(58) Field of Search ................ 101/484, 409, 101/216

(56) References Cited

U.S. PATENT DOCUMENTS

| 4,724,763 A | 2/1988 | Bolza-Schünemann et al. |
| 4,739,702 A | 4/1988 | Kobler |
| 4,854,236 A * | 8/1989 | Thunker et al. ............ 101/411 |
| 4,980,623 A * | 12/1990 | Anton .......................... 318/432 |
| 5,359,269 A * | 10/1994 | Wedeen et al. .............. 318/432 |
| 5,595,117 A * | 1/1997 | Chrigui ....................... 101/212 |
| 5,596,931 A | 1/1997 | Rössler et al. |
| 5,720,222 A * | 2/1998 | Reichardt .................... 101/216 |
| 5,724,437 A * | 3/1998 | Bucher et al. .............. 382/112 |
| 5,752,443 A | 5/1998 | Dawley |
| 6,000,298 A * | 12/1999 | Kato ........................... 74/569 |

FOREIGN PATENT DOCUMENTS

| DE | 35 27 711 C1 | 9/1986 |
| DE | 196 19 142 A1 | 3/1997 |
| EP | 0 230 518 A2 | 8/1987 |
| EP | 0 592 850 A1 | 4/1994 |

* cited by examiner

Primary Examiner—Andrew H. Hirshfeld
Assistant Examiner—Charles H. Nolan, Jr.
(74) Attorney, Agent, or Firm—Laurence A. Greenberg; Werner H. Stemer; Ralph E. Locher

(57) ABSTRACT

A method for compensating torsional vibrations of a printing machine by introducing torques which compensate vibration excitation, includes determining at least one characteristic form of a printing machine for at least one location on a drive train of the printing machine, determining and storing at least one respective countertorque for compensating the torques which excite vibration in a characteristic form at a location whereat the characteristic form is not zero, and applying the at least one countertorque at the corresponding location so that the vibration is maximally reduced due to the application of the at least one countertorque.

21 Claims, 3 Drawing Sheets

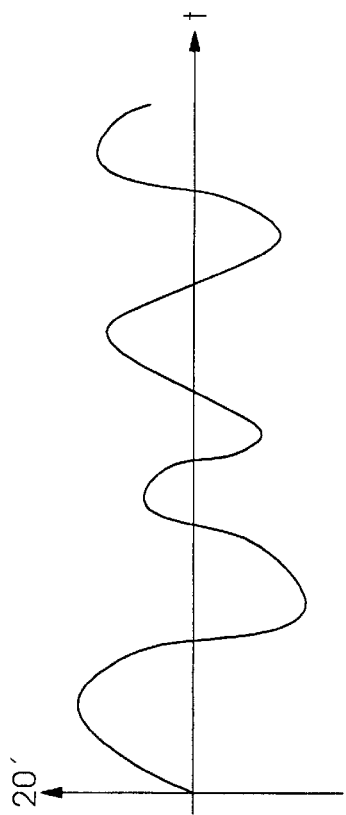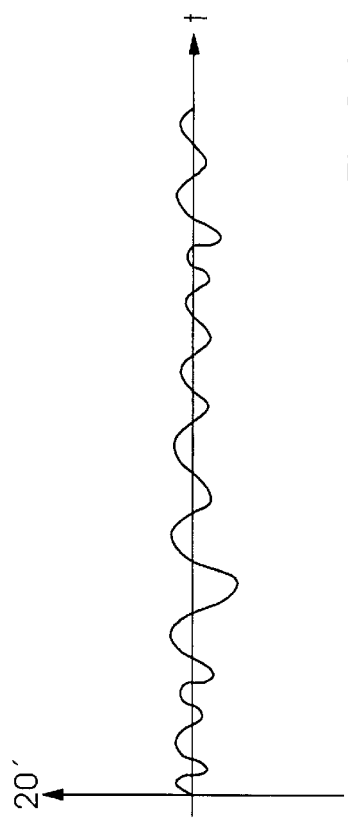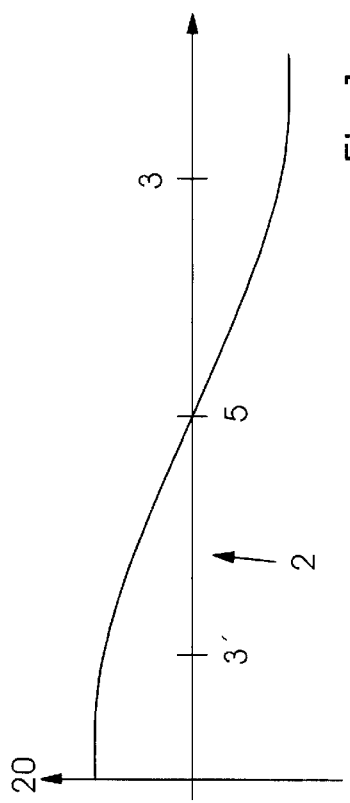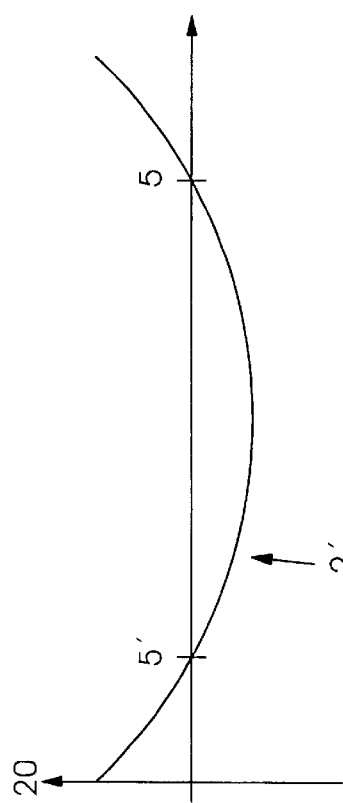

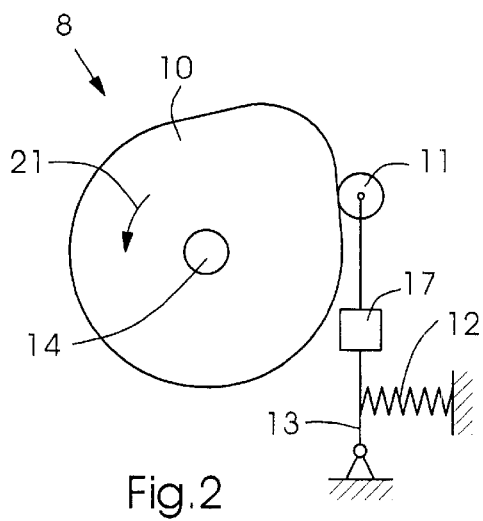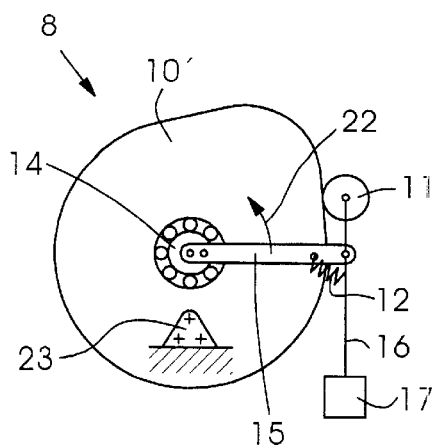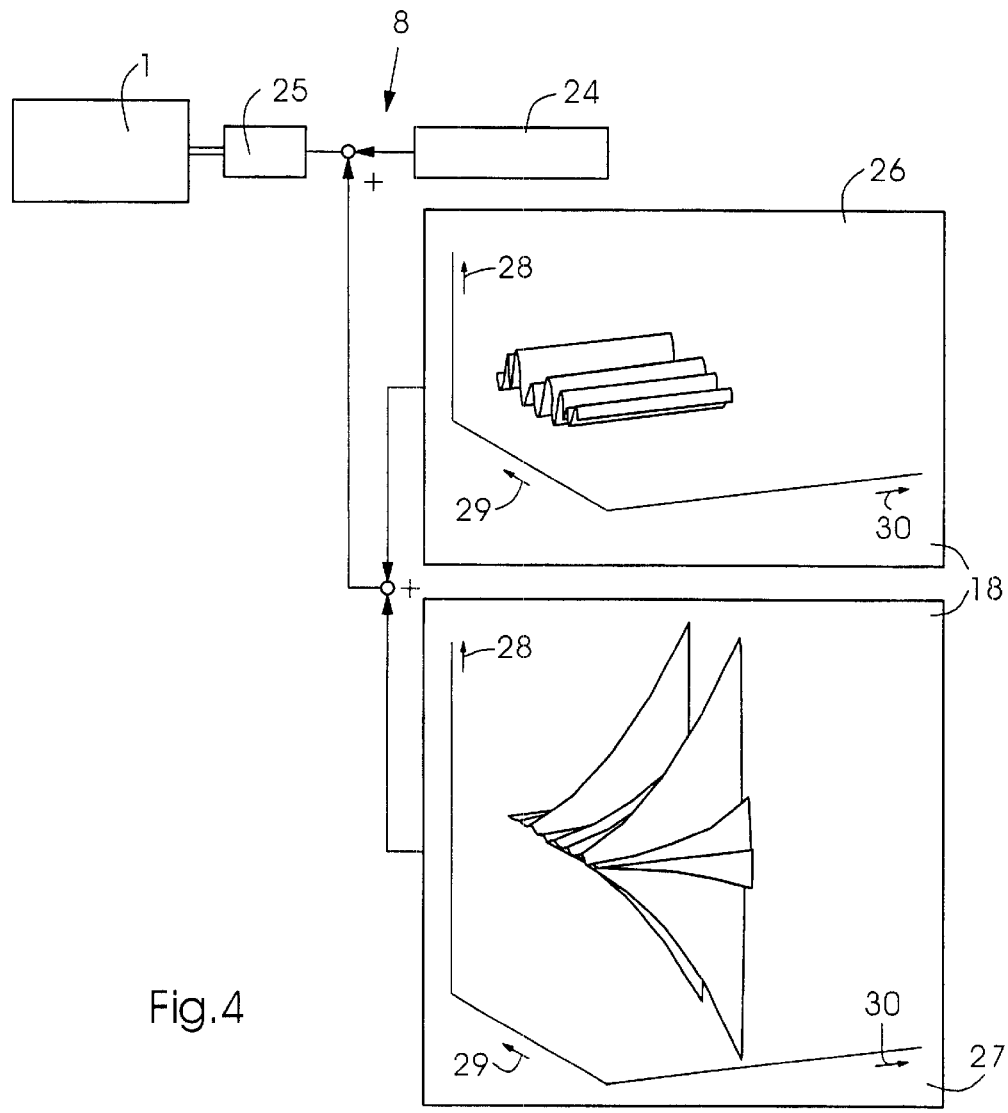

METHOD AND APPARATUS FOR COMPENSATING TORSIONAL VIBRATIONS OF A PRINTING MACHINE BY INTRODUCING TORQUES WHICH COMPENSATE THE VIBRATION EXCITATION

BACKGROUND OF THE INVENTION

FIELD OF THE INVENTION

The invention relates to a method for compensating torsional vibrations of a printing machine by introducing torques which compensate the vibration excitation. The invention relates, furthermore, to apparatus for performing this method, with at least one device for introducing torques into the drive train of a printing machine for compensating vibration excitations.

Various types of vibrations occur in printing machines and influence print quality. Predominent originating sources of vibrations are cylinder channels or gaps and also sheet transfer elements and other discontinuously operating machine elements. This leads, on the one hand, to bending vibrations in rollers and cylinders, but also to torsional vibrations of cylinders or drums. The latter are propagated via gearwheels of the gearwheel train. The occurring torsional vibrations can be described by a number of characteristic forms and amplitude/time profiles assigned thereto. In this regard, the characteristic forms reproduce a local amplitude distribution. They are printing machine properties independent of the excitation, and they depend upon the number of printing units and upon the type of construction of the machine. Such machine vibrations can be controlled by passive and active accessory systems.

The published European Patent Document EP 0 592 850 B1 discloses a device and a method providing active actuating elements, for example motors, on individual cylinders in order to activate the motors via measurements and controls so that regulating forces for damping the vibrations are generated. This is not an originally targeted counterstrategy against vibrations in the machine-typical characteristic forms, but rather, the vibrations which occur are measured and are thereafter controlled at the measurement location. In this way, compensation is not timely optimized, however, and requires a great outlay for regulating purposes, the risk being that regulation either has too great a time delay or itself causes vibrations. Nor are the compensating measures optimized with regard to the location thereof. If only a single actuating member is provided, it may lie at the zero crossing of a characteristic form of the printing machine, and, at this point, neither a value for the vibration in this characteristic form is determined, nor can countertorques be introduced thereat. If the compensating measure takes place at a location of low amplitudes of the characteristic form, correspondingly higher torques are required. In any case, a great outlay in sensor and regulation technology is required.

SUMMARY OF THE INVENTION

It is accordingly an object of the invention to provide a method and a device of the type mentioned in the introduction hereto, namely, for compensating torsional vibrations of a printing machine by introducing torques which compensate the vibration excitation, so that optimum compensation of torsional vibrations of a printing machine is achieved at the least possible expense or outlay.

With the foregoing and other objects in view, there is provided, in accordance with one aspect of the invention, a method for compensating torsional vibrations of a printing machine by introducing torques which compensate vibration excitation, which comprises determining at least one characteristic form of a printing machine for at least one location on a drive train of the printing machine, determining and storing at least one respective countertorque for compensating the torques which excite vibration in a characteristic form at a location whereat the characteristic form is not zero, and applying the at least one countertorque at the corresponding location so that the vibration is maximally reduced due to the application of the at least one countertorque.

In accordance with another mode, the method of the invention includes selecting the location for applying the at least one countertorque thereat because it is a location at which the amplitudes of the vibration in the characteristic form are high.

In accordance with a further mode, the method of the invention includes using a plurality of characteristic forms of a printing machine for determining countertorques.

In accordance with an added mode, the method of the invention includes determining the countertorques for an average rotational speed of the machine.

In accordance with an additional mode, the method of the invention includes determining the countertorques for various rotational speeds of the machine.

In accordance with yet another mode, the method of the invention includes, for changing the phase relationship of the required countertorques, introducing into the drive train at least two partial torques, the phase relationship of which is adjusted correspondingly.

In accordance with yet a further mode, the method of the invention includes, for a printing machine operating in a verso printing mode, determining the countertorques separately for each machine region adjacent to a reversing device, and separately applying the corresponding countertorques for each machine region.

In accordance with another aspect of the invention, there is provided an apparatus for performing a method of compensating torsion vibrations by introducing torques which compensate vibration excitation, comprising at least one device for introducing torques into a drive train of a printing machine for compensating vibration excitations, said at least one device being disposed at a location of the drive train at which a characteristic form having an excitation which is to be compensated is not zero, the torque for compensating the torques which excite vibration in the characteristic form being introducible to said at least one device, and said at least one device being able to impart a countertorque to said drive train.

In accordance with another feature of the invention, the at least one device is disposed at a location on the drive train at which amplitudes of the characteristic form are high.

In accordance with a further feature of the invention, the apparatus includes further devices for applying further countertorques, the further countertorques serving for compensating torques which excite vibration in further characteristic forms.

In accordance with an added feature of the invention, the at least one device is constructed for storing and retrieving countertorques for various machine parameters.

In accordance with an additional feature of the invention, the apparatus is in combination with a printing machine having at least one reversing device, each machine region adjacent the reversing device having the countertorque-applying device assigned thereto.

In accordance with yet another feature of the combination, the printing machine is convertible between recto printing and verso printing mode, and during such a conversion, the countertorque-applying device is adjustable therewith for the machine region adjusted in angular relationship thereof to the rest of the machine, so that the countertorques are applicable in a correct phase relationship.

In accordance with yet a further feature of the combination, the device for introducing torques is a motor.

In accordance with yet an added feature of the combination, the device for introducing torques comprises a hydraulic application of torque.

In accordance with yet an additional feature of the invention, the combination includes a control for receiving an entry therein of countertorques for various rotational speeds of the machine.

In accordance with an alternative feature of the combination, the device for introducing torques is at least one cam mechanism.

In accordance with still another feature of the combination, the cam mechanism has a cam disk fixedly connected to a gearwheel of the drive train, and a roller is included for applying a force to the cam mechanism.

In accordance with still a further feature of the combination, the cam mechanism has a stationary cam disk, and there is included a roller rotatable by an arm connected to a cylinder journal for applying a force to the cam mechanism.

In accordance with still an added feature of the invention, the combination of the invention includes an energy-storing device actable on a lever carrying the roller for applying the force.

In accordance with a concomitant feature of the invention, the combination of the invention includes an equalizing mass actable on the roller.

With regard to the method, the object is achieved in that at least one of the characteristic forms of a printing machine is determined, in that, for at least one location on the drive train of the printing machine, at which location the characteristic form is not zero, the respective countertorque for compensating the torques which excite vibration in the characteristic form is determined and stored, and in that the countertorque is applied at the corresponding location in such a manner that the vibration is maximally reduced as a result of the application of the at least one countertorque.

With regard to the apparatus, the object is achieved in that the at least one device is disposed at a location on the drive train at which the characteristic form is not zero, in that the torque for compensating the torques which excite vibration in the characteristic form is introduced to the at least one device and the at least one device imparts the countertorque to the drive train.

The essence of the invention is that even the origination of vibrations is as far as possible prevented. For this purpose, either the characteristic form having the largest fraction of overall vibration or this and other characteristic forms are determined for a printing machine. Then, for any location on the printing machine, at which location the corresponding characteristic form is not zero, the time profile is determined which a countertorque must have in order to compensate the torques which excite vibration in the characteristic form. This countertorque is then applied in order to prevent vibration excitation from the outset. As a result, excitation to the vibration in one characteristic form can be prevented in a concerted manner, without the vibrations in the remaining characteristic forms becoming excited to an appreciably greater extent. Because the vibration in one characteristic form normally predominates, this usually being the first characteristic form, a marked reduction in the vibrations over the entire length of the printing machine can be achieved by the introduction of countertorques at one location or at a few locations. If vibrations in further characteristic forms are also compensated, under some circumstances amplifications in the vibrations of the other characteristic forms occur, which are likewise to be compensated. The mutual reactions must therefore also be incorporated into the torques for the purpose of compensation. In this case, although the excitations of the characteristic form under consideration have some rotational speed dependence, this dependence is often not so great that it has to be included in the determination of the countertorques in every case. It is therefore often sufficient, in many cases, to determine and apply the countertorque for one or two locations on the printing machine and one rotational speed, in order to achieve effective compensation of the torsional vibrations of the printing machine. A measure of this kind entails a very low outlay. However, even the introduction of countertorques dependent on rotational speed involves a considerably lower outlay than the aforementioned regulation according to the prior art. Regulation and sensor technology are not required in the subject according to the invention.

Expediently, the location selected for applying a countertorque is a location at which the amplitudes of the characteristic form under consideration are high. The devices by which the torques which excite vibrations are compensated from the outset by countertorques is then also arranged at this location on the drive train of the printing machine. The aforementioned expedient refinement is obtained due to the fact that control of the vibrations is not possible at the zero crossing or near the zero crossing. By contrast, at the location of the highest amplitudes of the characteristic form, the vibrations assigned to this characteristic form can be controlled with the least possible outlay in terms of countertorques.

In order to control the torsional vibrations of a printing machine, the characteristic form which has the largest fraction of the overall vibration may be used. Here, this is, as a rule, the first characteristic form. It is also possible, however, to determine a plurality of characteristic forms of a printing machine in order to apply countertorques. In this regard, the countertorques must be calculated or measured correspondingly. Further devices for applying countertorques may, however, also be provided, in which case the countertorques must be determined for each location, taking into account the influence of the countertorques introduced at other locations.

The countertorques depend to some extent upon various parameters. As a rule, however, the influence of these can be ignored and average values can be selected. The rotational speed of the printing machine exerts the greatest influence. On many machines, however, the determination of the countertorques may likewise be performed for an average rotational speed of the machine. It is also possible, however, for the countertorques to be determined and applied for different machine rotational speeds. Other parameters may, however, also be taken into account correspondingly. Besides influences on the intensity of the required countertorques, there are also influences that do not relate to the intensity, but rather, to the phase relationship. This is the case with regard to format adjustments in verso printing or during the conversion or changeover from recto printing to verso printing, or the reverse. Because the phase relationship of the elements causing the vibrations is modified during these changeovers, the phase relationship of the torques exciting the vibration also changes and the phase relationship of the countertorques must therefore also be changed.

Particularly with regard to machines with a reversing or turning device, provision is made, in order to change the phase relationship of the countertorques required, for introducing into the drive train at least two partial torques, the phase relationship of which can be adjusted correspondingly. It is expedient, in a machine of this type, to determine the countertorques separately for each machine region adjacent to a reversing device. This necessitates a corresponding adaptation of the stored countertorque or at least two devices for introducing torques have to be mounted on the drive train, so that the corresponding countertorques are applied separately for each machine region. If installed appropriately, the devices are coadjusted along with cylinder adjustments, and the correct phase relationship is thereby also assigned automatically.

At least two of the devices would have to be provided in the case of one reversing device, at least three of the devices in the case of two reversing devices, and so forth. It is expedient, under these circumstances, that, when the printing machine is converted or changed over, the device for applying the countertorques is coadjusted for the machine region adjusted in the angular relation thereof to the rest of the machine, in such a manner that the countertorques can be applied in the correct phase relationship. The advantage of this is that, with the changeover or conversion from recto printing to verso printing, or the reverse, the devices for applying the countertorques are coadjusted in such a way that they always have the correct setting. For example, when cam mechanisms are mounted on cylinders or drums, coadjustment takes place so that the correct phase relationship of the partial torques for compensation is always set automatically. In a refinement of this type, the correct phase relationship is, as it were, stored mechanically.

The devices for compensating the torques which excite vibration in a characteristic form may be constructed in a wide variety of ways. For example, the device may be a motor or comprise a hydraulic application of torque. A control device is then necessary, wherein the magnitude and/or the phase relationship of the countertorque or countertorques are stored. The filing of a plurality of countertorques and, if appropriate, the phase relationship thereof is necessary when various parameters, for example, various rotational speeds of the printing machine, are to be taken into account. Parameters of this type may, of course, also be various paper formats in verso printing or the aforedescribed changeover or conversion from recto printing to verso printing, or the reverse.

In a particularly simple construction of the device, the latter is at least one cam mechanism. Such cam mechanisms can be constructed in various ways.

According to one proposal for the construction as a cam mechanism, a cam disk is provided, which is connected fixedly to a gearwheel of the drive train and which is loaded with a force by a roller. Conversely, of course, the cam disk may also be stationary and the roller mounting be connected fixedly to a gearwheel. In this case, loading with force may be carried out by an energy store, for example, a spring-loaded lever. By virtue of this simple construction, the required countertorque is applied independently of the rotational speed of the machine. This, in many cases, is already sufficient and leads to good results. If there is provision for an equalizing mass to act additionally on the roller, torque loading dependent upon the rotational speed is achieved as a result of the inertia of the equalizing mass. Force loading may also be performed by a double lever which is mounted on the gearwheel or on an arm connected to the latter and carries at one end the roller and at the other end an equalizing mass.

The two measures mentioned above may be combined with one another, in that both an energy storage device and an equalizing mass act upon the roller lever. A device for applying countertorques is thereby obtained, which first applies a partial countertorque independently of the rotational speed and, with an increasing rotational speed, provides an additional partial countertorque which takes into account the variation in the necessary countertorque when the machine is running at a higher rotational speed. The countertorques for different rotational speeds of the machine can thereby be, as it were, stored mechanically in a very simple manner.

Proposals made for implementing the principal according to the invention are, of course, only an illustrative list, and a multiplicity of possibilities for filing the necessary countertorques in terms of magnitude and phase relationship and also for applying the countertorques, even in the form of a plurality of partial torques, are possible.

Other features which are considered as characteristic for the invention are set forth in the appended claims.

Although the invention is illustrated and described herein as embodied in a method and apparatus for compensating torsional vibrations of a printing machine by introducing torques which compensate the vibration excitation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 1a is a plot diagram of a first characteristic form of a printing machine;

FIG. 1b is a plot diagram showing vibrations in a first characteristic form of the printing machine;

FIG. 1c is a plot diagram of a second characteristic form of the printing machine;

FIG. 1d is a plot diagram showing vibrations in the second characteristic form;

FIG. 2 is an enlarged fragmentary view of FIG. 1 showing in greater detail a device for introducing torques, in accordance with the invention;

FIG. 3 is a view like that of FIG. 2 of a device for speed-dependently introducing torques; and FIG. 4 is a diagrammatic view of a motor with a control for introducing torques, in accordance with the invention.

DESCRIPTION OF THE PREFERRED EMBODIMENTS

Figure 1:
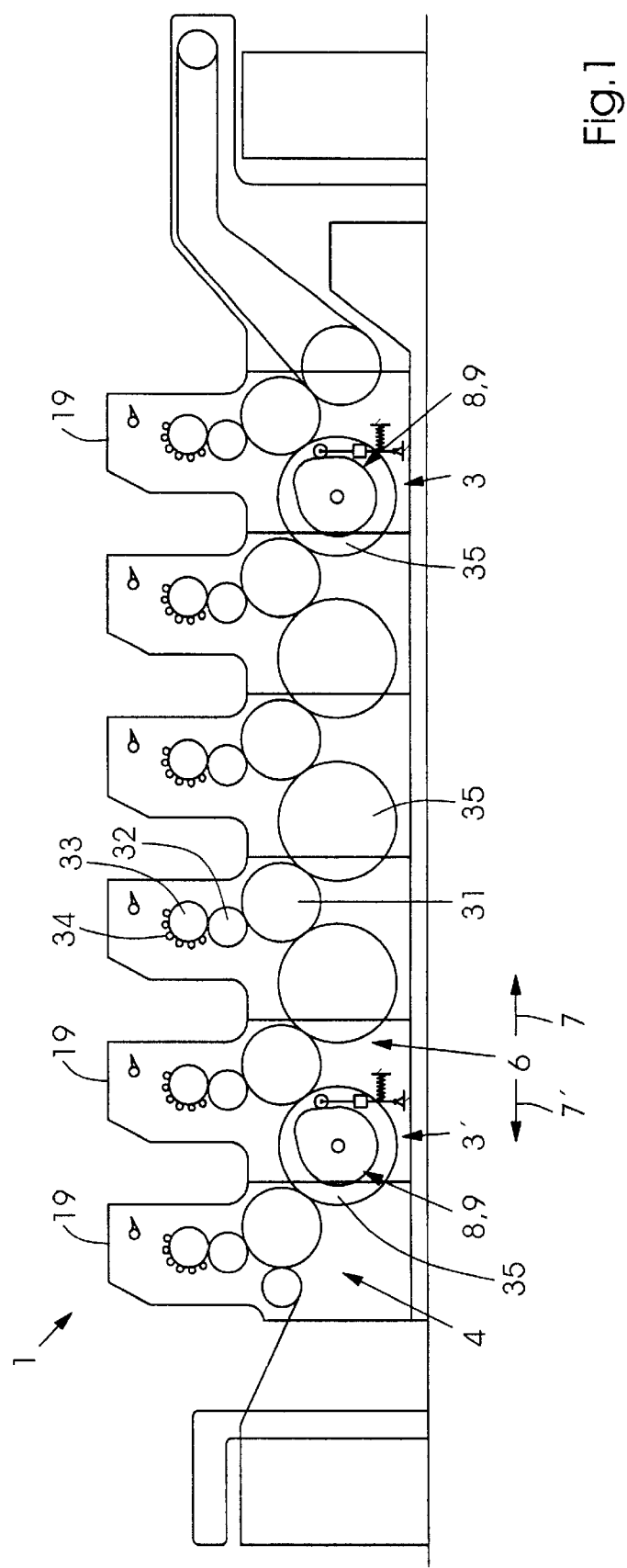
FIG. 1 is a diagrammatic side elevational view of a printing machine with a symbolic illustration of an apparatus for performing the method according to the invention.

Referring now to the drawings and, first, particularly, to FIG. 1 thereof, there is shown therein a printing machine 1 with a symbolic illustration of apparatus for performing the method according to the invention. The printing machine 1 has six printing units 19, each printing unit including a printing cylinder 31, a blanket cylinder 32, a plate cylinder 33 and an inking unit 34. Between the printing units 19, transfer drums 35, together with impression cylinders 31, carry respective non-illustrated intermeshing gearwheels forming a gearwheel train representing the drive train 4 of the printing machine. Due to various excitations, such as cylinder gaps or channels and other elements causing a discontinuous run, torsional vibrations are generated along the drive train 4 and lead to vibrations in characteristic forms of the printing machine 1. This overall vibration is a sum of various vibrations in various characteristic forms 2, 2' (note FIGS. 1a and 1c).

FIG. 1a shows an example of a first characteristic form 2 of a printing machine 1. Here, the height or level of the amplitude distribution 20 in the characteristic form 2 is plotted over that region of the printing machine 1 which is illustrated at the top of FIG. 1. The machine-specific characteristic form has a zero crossing 5, and 3 and 3' designate the locations for the selected introduction of the countertorques.

FIG. 1b shows an example of vibrations, attributable to the first characteristic form 2, in terms of their amplitude (20')–time (t) profile. The vibrations attributable to this first characteristic form are, as a rule, by far the strongest.

FIG. 1c shows a second characteristic form 2' of the printing machine 1. It has two zero crossings 5.

FIG. 1d shows the amplitude (20')–time (t) profile of the vibrations attributable to the second characteristic form.

Even further characteristic forms occur correspondingly, the vibrations attributable to them being, as a rule, so low that they do not need to be compensated.

The basic idea of the invention is that concerted action can be taken against vibration attributable to a characteristic form 2, 2', in that countertorques are applied from the outset against the torques exciting these vibrations. This is expediently performed in a region wherein the characteristic form has relatively high amplitudes 20. Thus, in the printing machine 1 illustrated in FIG. 1, the location 3 selected for determining and introducing a countertorque was the transfer drum 35 upline of the last printing unit 19. For introducing the countertorque, a cam mechanism 9 was provided, as a device 8 for introducing torques, onto the gearwheel of the transfer drum 35. In this case, the cam disk 10 and the force applied by a roller 11 are constructed and selected so that the necessary countertorque can be introduced into the drive train 4 in terms of amount and phase relationship.

If a turning device 6 is located in a printing machine 1 of this type, then, as illustrated in FIG. 1, each machine region 7 and 7' adjacent to the turning device 6 may have a device 8 assigned thereto for the introduction of torques. In the case at hand, a cam mechanism 9 was likewise assigned to the machine region 7' at a further location 3'. This is located at the first transfer drum 35. The device 8 for introducing torques could, of course, also be mounted on the impression cylinders 31. Mounting the device 8 on blanket cylinders 32 or plate cylinders 33 would also be possible.

FIG. 2 shows a device 8 for introducing torques, which is constructed as a cam mechanism 9. Fastened on a cylinder journal 14 or on the journal of a drum 35 is a cam disk 10 which rotates in the direction of the arrow 21 together with the cylinder or the drum. A roller 11 runs on the cam disk 10, and is fastened to a roller lever 13 which is loaded with a force by a spring 12. The construction and arrangement of the cam disk 10, and also the force of the spring 12 are such that the necessary countertorques are achieved. In this construction of the cam mechanism 9, always the same countertorque is applied, irrespective of the rotational speed. This is sufficient for a multiplicity of applications. If an equalizing mass 17 is also assigned to the roller lever 13, the applied countertorque becomes speed-dependent due to the inertia thereof.

FIG. 3 shows a device 8 for speed-dependently introducing torques in the form of a cam mechanism 9'. The stationary cam disk 10' is connected to the machine housing by a fastening 23. An arm 15 is located on the cylinder journal 14 or on the journal of a drum and rotates in the direction of the arm 22 together with the cylinder or the drum. Fastened pivotably to the arm 22 is a double lever 16 which rotatably carries at one end the roller 11 and at the other end an equalizing mass 17. Due to the application of a spring 12, the bearing of the roller 11 against the cam disk 10' is assured, and a speed-independent countertorque is likewise introduced. Speed dependence arises, in this exemplary embodiment, because, with an increasing rotational speed, the equalizing mass 17 is subjected to an increasing centrifugal force and inertia forces and therefore loads the roller 11 with a force dependent upon the rotational speed.

FIG. 4 shows a motor 25 which loads the printing machine 1 with the appropriate countertorques. In this embodiment, for example, the same result can be produced by an electric control 18 as by the combination of two cam mechanisms 9 and 9', as were described hereinabove. In this regard, the motor 25 may be a separate motor or the drive motor of the printing machine 1. The latter is possible, however, only if it is not located at the zero crossing 5 of a characteristic form to be compensated. For controlling the motor 25, in addition to the normal motor control 24, a control 18 is provided which additionally loads the motor 25 with the current for generating the countertorques. In the exemplary embodiment illustrated in FIG. 4, both a component 26 constant in terms of rotational speed and a component 27 variable in terms of rotational speed are stored. The illustrations symbolize the stored countertorques, the three-dimensional illustrations plotting the amplitudes 28 of the necessary countertorques against the rotary angle 29 and the machine speed 30 in revolutions per hour. The sum of the component 26 constant in terms of rotational speed and of the component 27 variable in terms of rotational speed yields the countertorque required for the respective rotational speed of the printing machine 1.

The explanations are, of course, merely by way of example, and other possibilities for implementing the idea of the invention may be contemplated. For example, a hydraulic application of countertorques by a corresponding hydraulic control, for example, an oil-pressure control, could also be performed.

We claim:

1. A method for compensating torsional vibrations of a printing machine by introducing torques which compensate vibration excitation, which comprises determining at least one characteristic form of a printing machine for at least one location on a drive train of the printing machine, determining and storing at least one respective countertorque for compensating the torques which excite vibration in a characteristic form at a location whereat the characteristic form is not zero, and applying the at least one countertorque at the corresponding location so that the vibration is maximally reduced due to the application of the at least one countertorque.

2. The method according to claim 1, which includes selecting the location for applying the at least one countertorque thereat because it is a location at which the amplitudes of the vibration in the characteristic form are high.

3. The method according to claim 1, which includes using a plurality of characteristic forms of a printing machine for determining countertorques.

4. The method according to claim 1, which includes determining the countertorques for an average rotational speed of the machine.

5. The method according to claim 1, which includes determining the countertorques for various rotational speeds of the machine.

6. The method according to claim 1, which includes, changing the phase relationship of the required countertorques, introducing into the drive train at least two partial torques, the phase relationship of which is adjusted correspondingly.

7. The method according to claim 1, which includes, for a printing machine operating in a verso printing mode, determining the countertorques separately for each machine region adjacent to a reversing device, and separately applying the corresponding countertorques for each machine region.

8. An apparatus for performing a method of compensating torsion vibrations by introducing torques which compensate vibration excitation, comprising at least one device for introducing torques into a drive train of a printing machine for compensating vibration excitations, said at least one device being disposed at a location of the drive train at which a characteristic form having an excitation which is to be compensated is not zero, the torque for compensating the torques which excite vibration in the characteristic form being introducible to said at least one device, and said at least one device being able to impart a countertorque to said drive train.

9. The apparatus according to claim 8, wherein said at least one device is disposed at a location on said drive train at which amplitudes of said characteristic form are high.

10. The apparatus according to claim 8, including further devices for applying further countertorques, the further countertorques serving for compensating torques which excite vibration in further characteristic forms.

11. The apparatus according to claim 8, wherein said at least one device is constructed for storing and retrieving countertorques for various machine parameters.

12. The apparatus according to claim 8, in combination with a printing machine having at least one reversing device, each machine region adjacent said reversing device having said countertorque-applying device assigned thereto.

13. The combination according to claim 12, wherein the printing machine is convertible between recto printing and verso printing mode, and during such a conversion, said countertorque-applying device is adjustable therewith for the machine region adjusted in angular relationship thereof to the rest of the machine, so that the countertorques are applicable in a correct phase relationship.

14. The combination according to claim 8, wherein said device for introducing torques is a motor.

15. The combination according to claim 8, wherein said device for introducing torques comprises a hydraulic application of torque.

16. The combination according to claim 11, including a control for receiving an entry therein of countertorques for various rotational speeds of the machine.

17. The combination according to claim 8, wherein said device for introducing torques is at least one cam mechanism.

18. The combination according to claim 17, wherein said cam mechanism has a cam disk fixedly connected to a gearwheel of said drive train, and including a roller for applying a force thereto.

19. The combination according to claim 17, wherein said cam mechanism has a stationary cam disk, and including a roller rotatable by an arm connected to a cylinder journal for applying a force to said cam mechanism.

20. The combination according to claim 18, including an energy-storing device actable on a lever carrying said roller for applying the force.

21. The combination according to claim 18, including an equalizing mass actable on said roller.

* * * * *